(12) United States Patent
Vanlint

(10) Patent No.: US 6,922,417 B2
(45) Date of Patent: Jul. 26, 2005

(54) METHOD AND SYSTEM TO CALCULATE NETWORK LATENCY, AND TO DISPLAY THE SAME FIELD OF THE INVENTION

(75) Inventor: Paul Vanlint, Mountain View, CA (US)

(73) Assignee: Compuware Corporation, Farmington Hills, MI (US)

( * ) Notice: Subject to any disclaimer, the term of this patent is extended or adjusted under 35 U.S.C. 154(b) by 821 days.

(21) Appl. No.: 09/770,969

(22) Filed: Jan. 25, 2001

(65) Prior Publication Data
US 2001/0050903 A1 Dec. 13, 2001

Related U.S. Application Data

(60) Provisional application No. 60/178,678, filed on Jan. 28, 2000.

(51) Int. Cl.[7] .................................................. H04J 3/06
(52) U.S. Cl. ........................ 370/503; 370/411; 702/187
(58) Field of Search ................................ 702/186–188, 702/176–178, 183; 709/223, 224, 227, 232–235; 370/229, 230, 230.1, 232, 233, 242, 248, 249, 252, 253, 254, 255, 259, 351, 400, 401, 411, 465, 477, 503, 234; 700/14, 15, 28

(56) References Cited

U.S. PATENT DOCUMENTS

| 5,101,402 A | * | 3/1992 | Chiu et al. ................... 709/224 |
| 6,012,096 A | * | 1/2000 | Link et al. ................... 709/233 |
| 6,587,875 B1 | * | 7/2003 | Ogus ........................... 709/223 |
| 6,651,099 B1 | * | 11/2003 | Dietz et al. .................. 709/224 |
| 2001/0039579 A1 | * | 11/2001 | Trcka et al. ................. 709/224 |

* cited by examiner

Primary Examiner—Wellington Chin
Assistant Examiner—John Shew
(74) Attorney, Agent, or Firm—Fenwick & West LLP

(57) ABSTRACT

A method to calculate network latency includes correlating a first packet identifier recorded at a first network location with a second packet identifier recorded at a second network location, wherein the first and second packet identifiers indicate a common first packet and have respective first and second timestamps associated therewith. A first network traversal time for the first packet is calculated as the difference between the first and second timestamps associated with the first and second packet identifiers respectively. The network traversal time for the first packet is then the graphically display.

57 Claims, 10 Drawing Sheets

METHOD AND SYSTEM TO CALCULATE NETWORK LATENCY, AND TO DISPLAY THE SAME FIELD OF THE INVENTION

This application claims the benefit of provisional application No. 60/178,678, filed Jan. 28, 2000.

FIELD OF THE INVENTION

The present invention relates generally to the field of network application performance analysis and, more specifically, to a method and system to calculate network latency, and to display information pertaining to such network latency, for example, via a graphical user interface.

BACKGROUND OF THE INVENTION

Conventional approaches to application performance analysis assume static values for latency and bandwidth, based on known values. The known values may be utilized to estimate the effect of a subject network on traffic generated by a particular application. However, in many situations, latency and available bandwidth are variable over time, and these variations may cause performance problems for applications. In order to determine whether latency and bandwidth are negatively impacting the performance of an application, an analyst preferably requires exact knowledge of packet behavior on the subject network. By simply capturing packet traces at various locations on the subject network along a network traffic route, an analyst may be able to ascertain that delays are occurring. However, the simple identification of a delay does not provide sufficient information regarding the cause of the delay. For example, an analyst is not readily able to ascertain whether the delay is being caused by a client, a server, or the network device.

SUMMARY OF THE INVENTION

According to one embodiment of the present invention, there is provided a method of calculating network latency. The method includes correlating a first packet identifier recorded at a first network location with a second packet identifier recorded at a second network location, wherein the first and second packet identifiers indicate a common first packet and have respective first and second timestamps associated therewith. A first network traversal time for the first packet is calculated as the difference between the first and second timestamps associated with the first and second packet identifiers respectively. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to calculate network latency, and to display the same, are described. In the following description, for purposes of explanation, numerous specific details are set forth in order to provide a thorough understanding of the present invention. It will be evident, however, to one skilled in the art that the present invention may be practiced without these specific details.

In one embodiment of the present invention, the limitations of conventional approaches to application performance are at least partially addressed by combining packet traces generated at multiple network locations on a subject network into a single, coherent model from which packet behavior on a subject network can be determined, thus allowing latency and bandwidth problems to be attributed, for example, to a client, server or a network itself.

In an exemplary client-server application, a client may send a request to the server utilizing one or more request packets. Such request packets will take a finite time to traverse a network due to network latency and bandwidth bottlenecks. Once such request packets are received by the server, the server will process the request and then send a response back to the client utilizing one or more response packets. The server may wait until the request is fully completed before sending the response back to the client, or may begin sending response packets when only a portion of the response data has been accumulated. Again, these response packets will take a finite time to traverse the network due to network latency and bandwidth bottlenecks. However, the actual network route taken on the return journey by the response packets may well be different from the route taken by the request packets. At several points along each of these request and response routes, network capture agents or applications (e.g., a sniffer or program protocol analyzer) may be deployed to capture trace files of the request and response packets. The trace files include timestamps indicating a time at which observed packets passed the capture agents.

The present invention, in one exemplary embodiment, receives multiple trace files generated at multiple network nodes and identifies an instance of each packet that appears in each of the multiple trace files, and correlates the appearance (or recording) of packets in the multiple trace files. In this way, the times at which a particular packet passed multiple capture agents may be determined. In performing this operation, the present invention may correlate packets seen in a trace file with and only with instances of the same packet that appear in other trace files. Further, this operation includes determining the direction that a particular packet was traveling in, determining the location of one or more network nodes, and the synchronizing of start times of each trace file with other trace files.

Exemplary Network Environment

Figure 1:
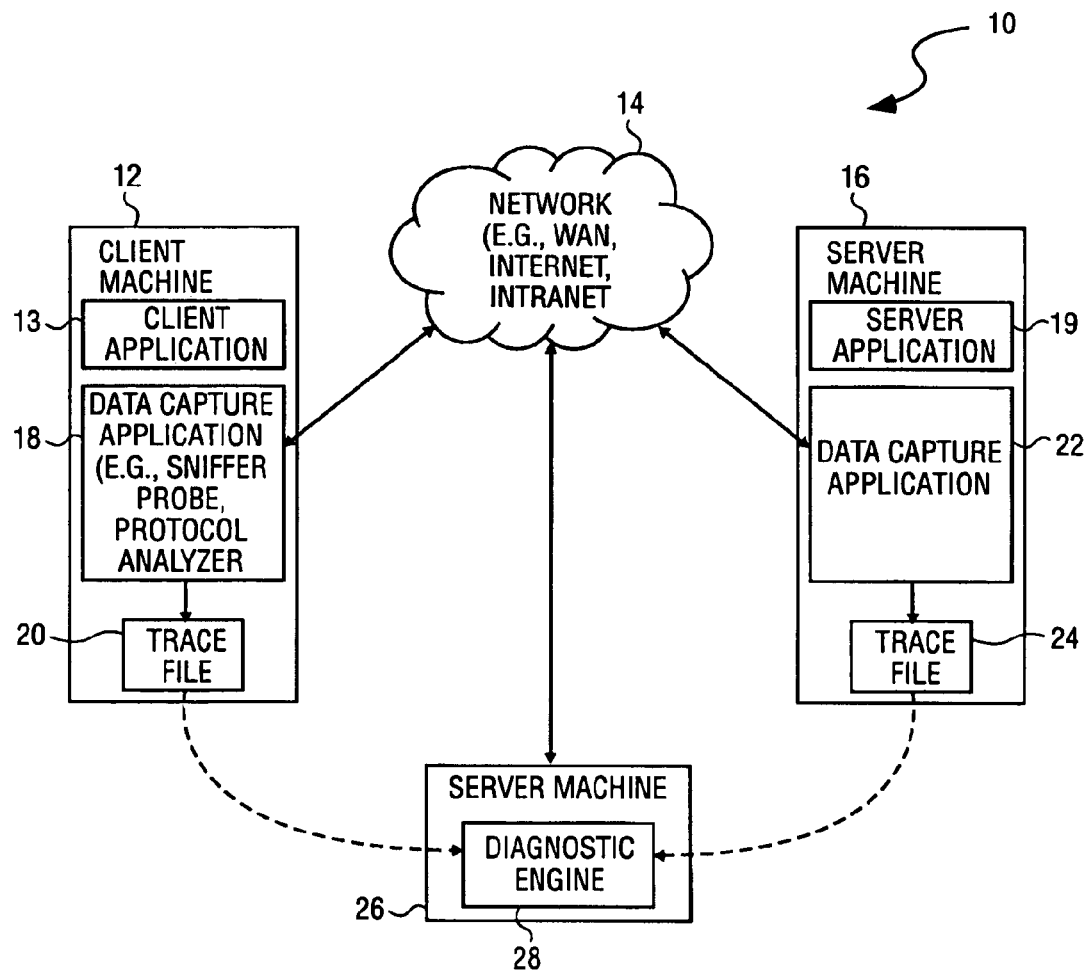
FIG. 1 is a diagrammatic representation of an exemplary network environment 10, within which the present invention may be employed to perform application performance analysis, to calculate network latencies, and to output such latencies.
Figure 5:
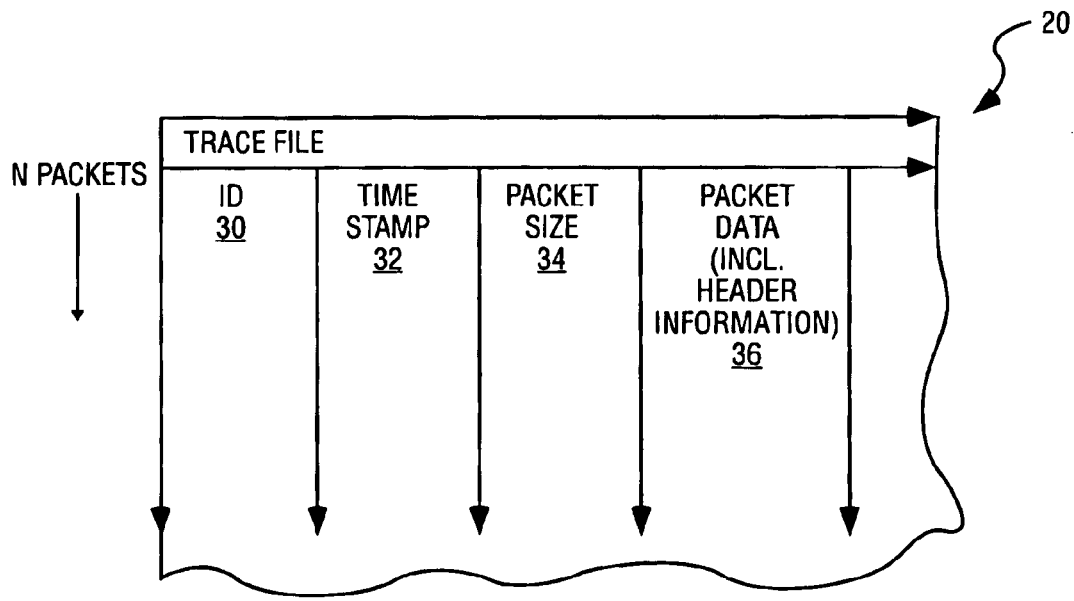
FIG. 5 is a diagrammatic representation of an exemplary trace file that includes entries for N packets, each entry recording a packet identifier, a timestamp, a packet size, and packet data.

FIG. 1 is a diagrammatic representation of an exemplary network environment 10 within which the present invention may be deployed to perform application performance analysis and, more specifically, to calculate network latencies and to output such latencies, for example, as a graphical display. The network environment 10 is shown to include a client machine 12 that hosts a client application 13. In an exemplary embodiment, the client application 13 communicates with a server application 19, hosted on a server machine 16, via a network 14. The network 14 may be any one of a number of well-known network types, such as an intranet, the Internet, a Wide Area Network (WAN) or a Local Area Network (LAN) and may employ any one or more of a number of well-known communication protocols (e.g., IP, TCP, UDP etc.). The client machine 12 is further shown to host a data capture application 18 (e.g., a sniffer or program protocol analyzer) that generates a trace file 20. Commercially available examples of such a data capture application 18 include the Microsoft Network Monitor (NetMon) developed by Microsoft Corp. of the Redmond, Wash. and the Optimal Smart Agent developed by the Optimal Networks Corp. of Mountain View, Calif., now owned by the Compuware Corp. of Detroit Mich. The trace file 20 generated by the data capture application 18 includes an entry for each packet observed by the data capture application 18 to be transmitted from, or received at, the client machine 12. While an entry within the trace file 20 may include any data contained in a packet that the data capture application 18 is configured to capture, for the purpose of the present invention, each entry includes at least (1) a packet identifier, preferably comprising unique, static content extracted from the packets, and (2) a timestamp indicating a time at which the data capture application 18 observed a specific packet. FIG. 5 provides an illustration of an exemplary trace file 20 that includes entries for N packets, each entry recording a packet identifier 30, a timestamp 32, a packet size 34, and packet data 36, which may include header information. The packet identifier 30 is determined by the data capture application 18 so as to be highly unique (although not necessarily absolutely unique) and static for a packet observed by the application 18. The exact content of the packet identifier may vary from protocol to protocol. For example, Internet Protocol (IP) packets may have a packet identifier 30 comprised from the IP source and destination addresses, an IP fragment identifier, and an IP fragment offset. TCP packets, on the other hand, may have packet identifiers 30 composed of TCP ports, a TCP sequence and/or TCP acknowledge numbers in addition to IP fields. UDP packets may have packet identifier 30 composed of UDP ports used in conjunction with IP fields.

Returning to FIG. 1, the server machine 16 is similarly shown to host a server data capture application 22 that produces a trace file 24. The trace file 24 includes entries for packets observed being received at, or transmitted from, the server machine 16. It will be appreciated that the network 14 may include any number of further nodes (e.g., switches, routers etc.), each of which may similarly host a data capture application that generates a trace file for packets observed at the relevant node.

In the exemplary embodiment, the trace files 20 and 24 generated at the client machine 12 and the server machine 16 respectively are shown to be communicated to a further server machine 26 that hosts a diagnostic engine 28, according to exemplary embodiment of the present invention. The diagnostic engine 28 operates to correlate entries within multiple trace files, received from the various nodes on a network route, by identifying entries for common packets within such multiple trace files. In addition to performing a correlation operation, the diagnostic engine 28 further operates to determine the direction of transmission of a particular network packet, and to synchronize multiple trace files to a common timeline. The diagnostic engine 28 facilitates meaningful analysis and provides a unified view of information embodied in multiple trace files generated at multiple nodes along multiple network paths or routes.

Diagnostic Engine

Figure 2:
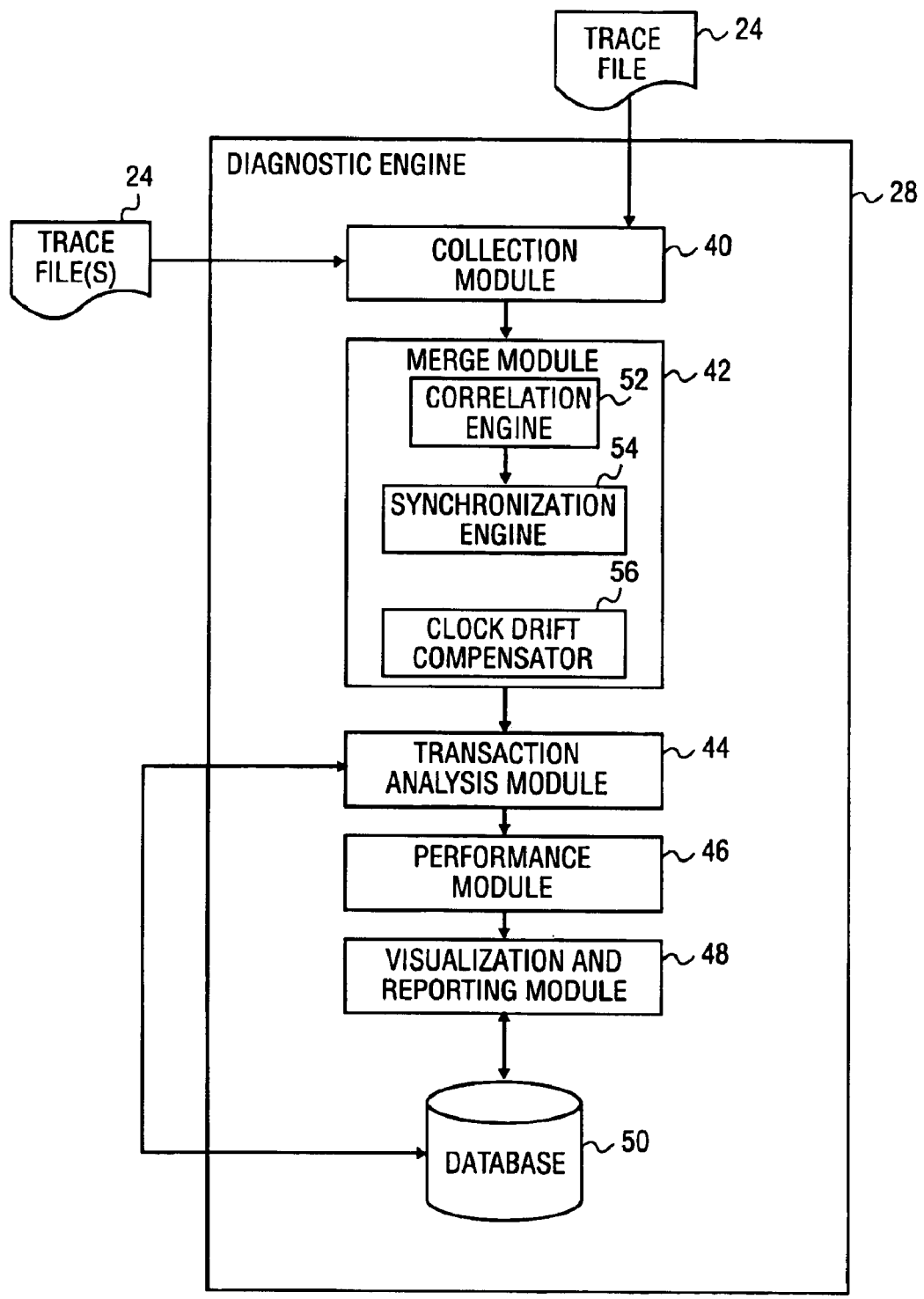
FIG. 2 is a block diagram illustrating the architecture of a diagnostic engine 28, according to an exemplary embodiment of the present invention.

FIG. 2 is a block diagram illustrating the architecture of the diagnostic engine 28, according to an exemplary embodiment of the present invention. A collection module 40 is responsible for requesting and/or receiving trace files 20 from multiple nodes along a network route or path. The trace files may, in one embodiment, be requested by the collection module 40, responsive to which the data capture applications communicate trace files to the collection module 40. In an alternative embodiment, the data capture applications may periodically communicate trace files to the collection module 40.

A merge module 42 is responsible for the "merging" of multiple trace files received by the collection module 40. Specifically, the merging of trace files is performed by a correlation engine 52 that operates to correlate entries for common packets that appear within multiple trace files. The synchronization engine 54 operates to synchronize information retrieved from multiple trace files to a common timeline. The synchronization engine 54 may call upon a clock drift compensator 56 to compensate for clock drift that may be exhibited in the timestamps recorded within one or more trace files. In summary, the merge module 42 operates to provide a consolidated view of network traffic based on information contained within trace files generated at multiple nodes along a network path for route.

A transaction analysis module 44 performs automated analysis of the output of the merge module 42 to provide meaningful and customizable views of the consolidated, correlated data. The performance module 46, utilizing the output of the transaction analysis module 44 and the merge module 42, operates to provide an analysis of the performance of a network application as affected by network conditions (e.g., latency and bandwidth bottlenecks) and may provide certain automated suggestions regarding improvements to application performance. A visualization and reporting module 48 operates to provide various graphical user interfaces and graphical displays of the outputs of the merge module 42, the transaction analysis module 44 and the performance module 46. Examples of graphical displays generated by the visualization and reporting module 48 are discussed in further detail below.

Each of the modules 42, 44, 46 and 48 is configured to write data to, and retrieve data from, a database 50.

Examples of various tables that may be stored in the database 50 are also discussed below.

Merging of Trace Files—Methodology Overview

Figure 3:
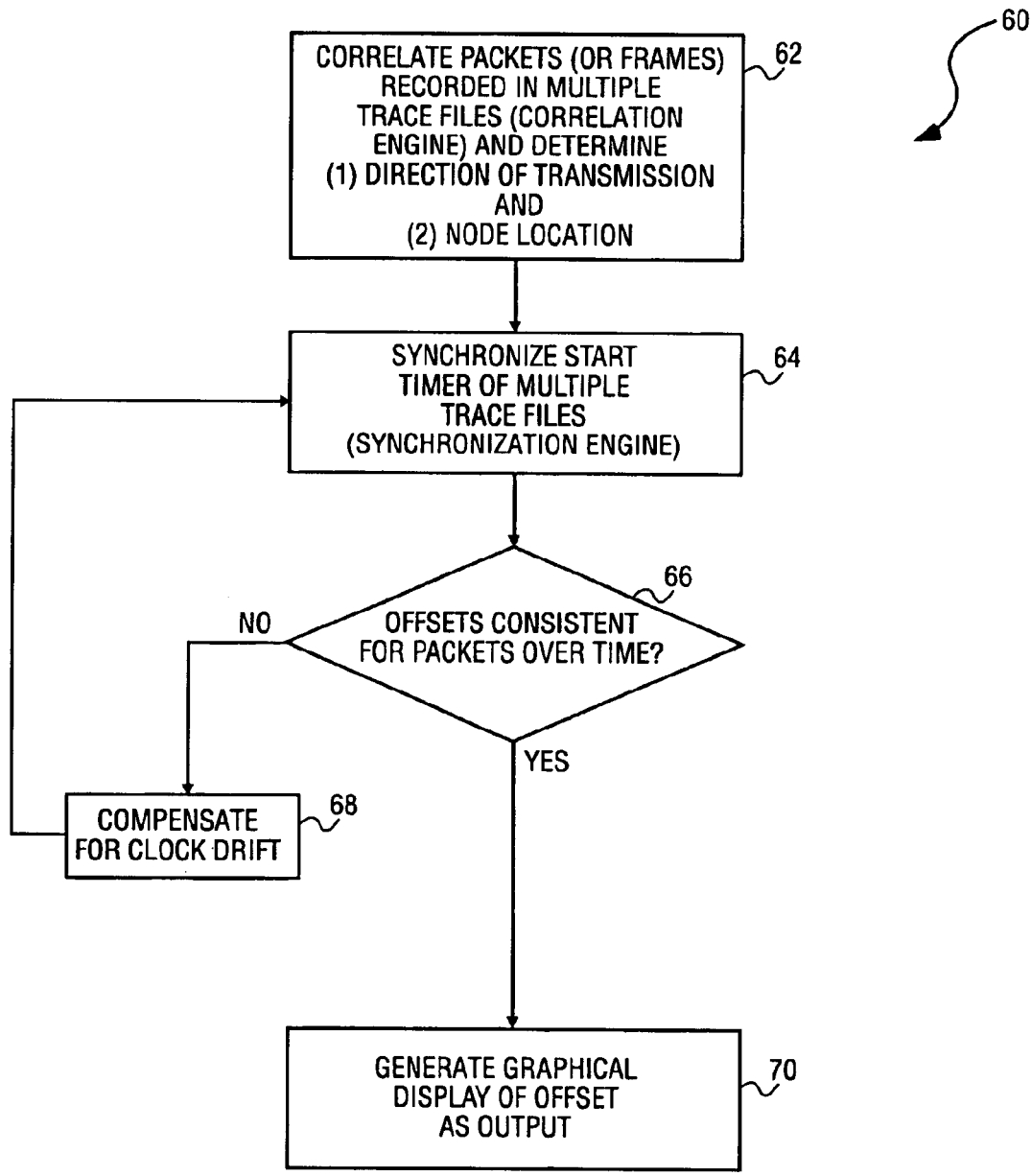
FIG. 3 is a flowchart illustrating a method 60, according to an exemplary embodiment of the present invention, of merging one or more trace files to provide a consolidated view of network traffic.

FIG. 3 is a flowchart illustrating a method 60, according to exemplary embodiment of the present invention, of merging one or more trace files to provide a consolidated view of network traffic. The method 60 comprises two primary operations, namely (1) a correlation operation performed at block 62 and (2) a synchronization operation performed at block 64.

Figure 7:
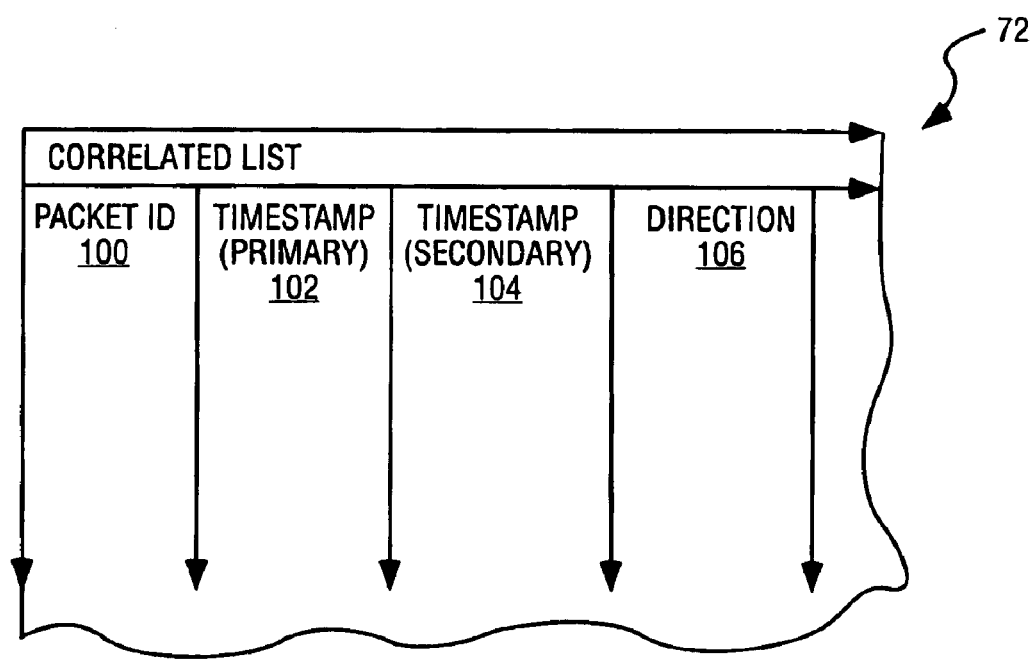
FIG. 7 is a diagrammatic representation of an exemplary correlated list, according to one embodiment of the present invention.

At block 62, following receipt of multiple trace files 20 at the collection module 40, the correlation engine 52 of the merge module 42 proceeds to correlate packets (or frames) recorded in such trace files 20. Specifically, the collection module 40 produces a correlated list 72 of packets together with references to the location of each packet in each trace file. An exemplary correlated list 72 is illustrated in FIG. 7.

Further, at block 62, the direction of transmission of each packet is determined to aid in the synchronization of the trace files at block 64. In a first embodiment, for IP packets, a time-to-live (TTL) field may be compared across correlate entries within multiple trace files to determine the direction of a packet transmission. Specifically, when an IP packet traverses a router, that router decrements the TTL field. For IPX, hop count fields can be compared across trace files. Specifically, when an IPX packet traverses a router, the router will increment the hop count field. Differences in the TTL field and/or the hop count fields may be utilized to determine the direction of transmission of an IP packet. In a second embodiment, for protocols other than the IP and IPX protocols, or for packets that cannot cross a logical router, a statistical analysis of the response times for each node can be performed. If the differences in the response times between the traces are significant compared to an error each packet's timestamp, then the transmission direction of the packet may be deduced. In a third embodiment, a data capture application that generated the trace file performs an active trace route to the node to gain additional information not already contained in a relevant trace file. By comparing such a "node map", direction information may be deduced.

At block 62, node location may also be determined. Specifically, nodes that exhibit common direction information across all trace files can be grouped as being at a common logical location to aid in the visualization of the data. Alternatively, if "node maps" have been generated, nodes may be grouped based on such maps.

At block 64, the start times of multiple trace files are synchronized by the synchronization engine 54. Specifically, to successfully combined (or merged) two or more trace files, such trace files must be synchronized to a common timeline. In one embodiment, the timeline of a chosen first trace file (e.g., the trace file 20 generated by the data capture application 18 hosted by the client machine 12) is allocated as the common timeline and all other trace files are synchronized to this timeline. Utilizing the packet direction information determined by the correlation engine 52 at block 62, the synchronization engine 54 is able to perform an analysis to determine upper and lower limits on how far a trace file can be shifted in time, while maintaining physical consistency within the system (e.g., no packet should appear to travel backwards in time). These upper and lower limits related to the minimum network delay in each direction (e.g., request and response directions). Once these upper and lower limits have been determined, an assumption is made that the minimum network delay in each direction is equal, and each trace file is shifted by that minimum network delay. It should be noted that not all networks have symmetrical latency characteristics, especially if response packets take a different route from request packets. Such an assumption may provide the appearance that latency problems are split equally between two directions, whereas one direction may have a particular high latency. Further details regarding the synchronization of multiple trace files are discussed below with reference to FIG. 8.

At decision block 66, the synchronization engine 54 makes a determination as to whether the calculated latencies (or offsets) are consistent for packets over time, within certain parameters. If not the method 60 proceeds to block 68 where the synchronization engine 54 may engage the clock drift compensator 56 to compensate for clock drift. On the other hand, should the calculated latencies (or offsets) be consistent within the defined parameters over time, the method 60 proceeds to block 70, where the transaction analysis module 44 and the performance module 46 perform their respective functions, and the visualization and reporting module 48 generates a graphical display of the calculated offsets as output.

Correlation—Methodology

Figure 4:
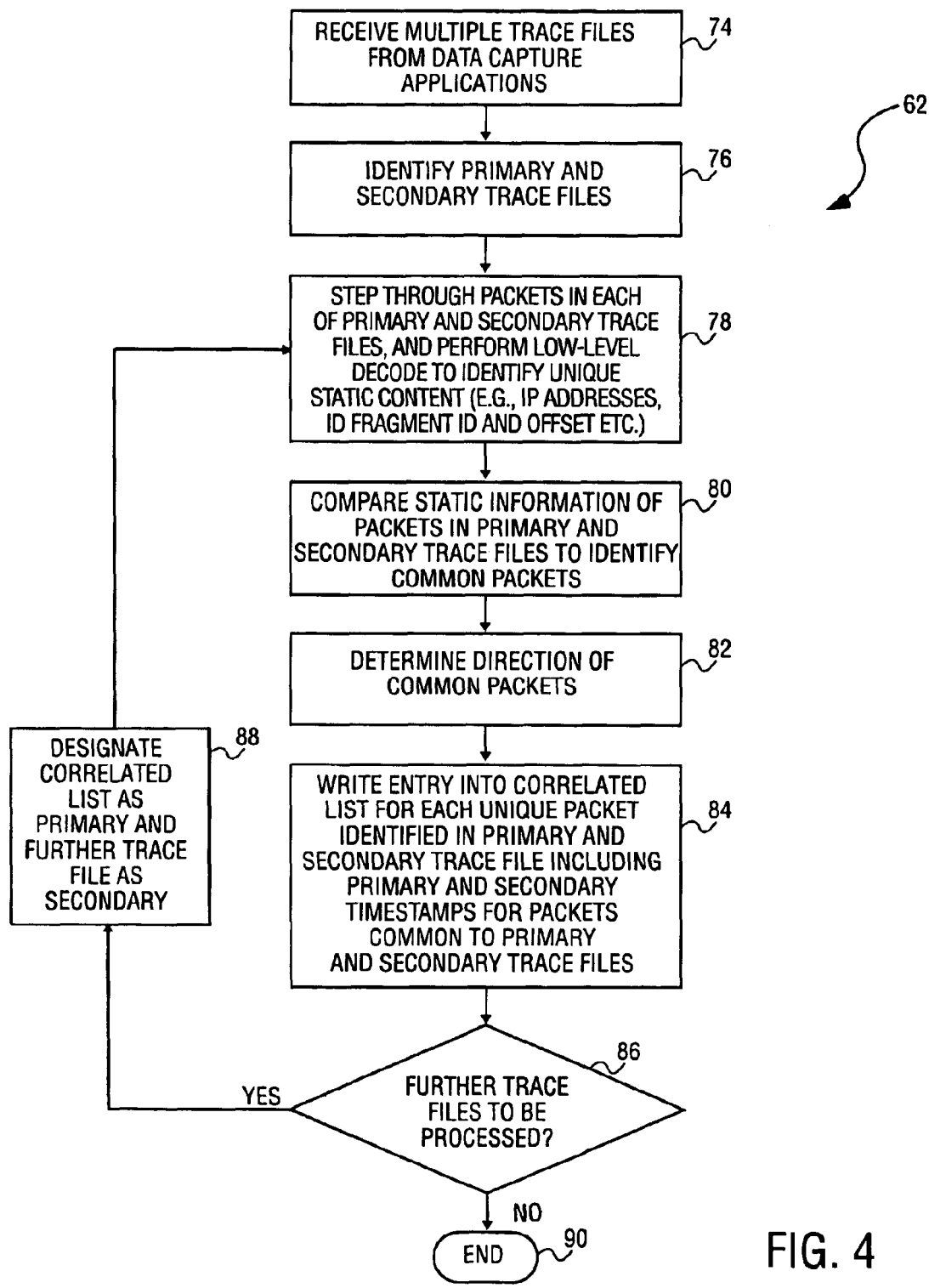
FIG. 4 is a flowchart illustrating an exemplary method 62, according to one embodiment of the present invention, of performing a correlation operation.

FIG. 4 is a flowchart illustrating an exemplary method 62, according to one embodiment of the present invention, of performing the correlation operation discussed above with reference to block 64 of FIG. 3. At block 74, the collection module 40 receives multiple trace files from respective data capture applications hosted on nodes that constitute a network route. At block 76, the correlation engine 52 identifies a primary trace file and at least one secondary trace file to be correlated or "merged". The identification of the primary trace file may, in one embodiment, be performed responsive to manual input from an analyst. For example, the primary trace file may be the trace file 20 generated at the client machine 12.

Figure 6A:
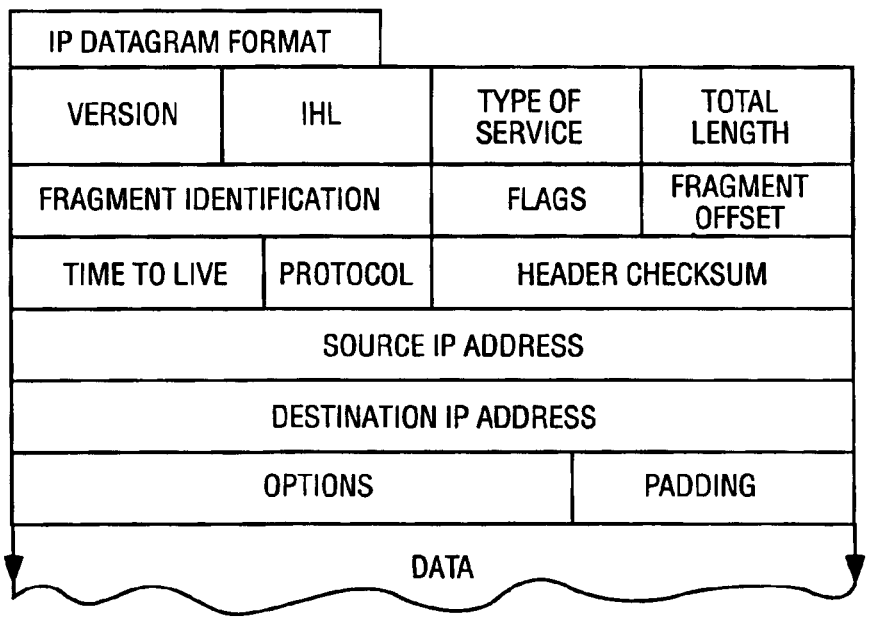
FIGS. 6A–6C illustrate header information for the IP, TCP and UDP protocols respectively.
Figure 6B:
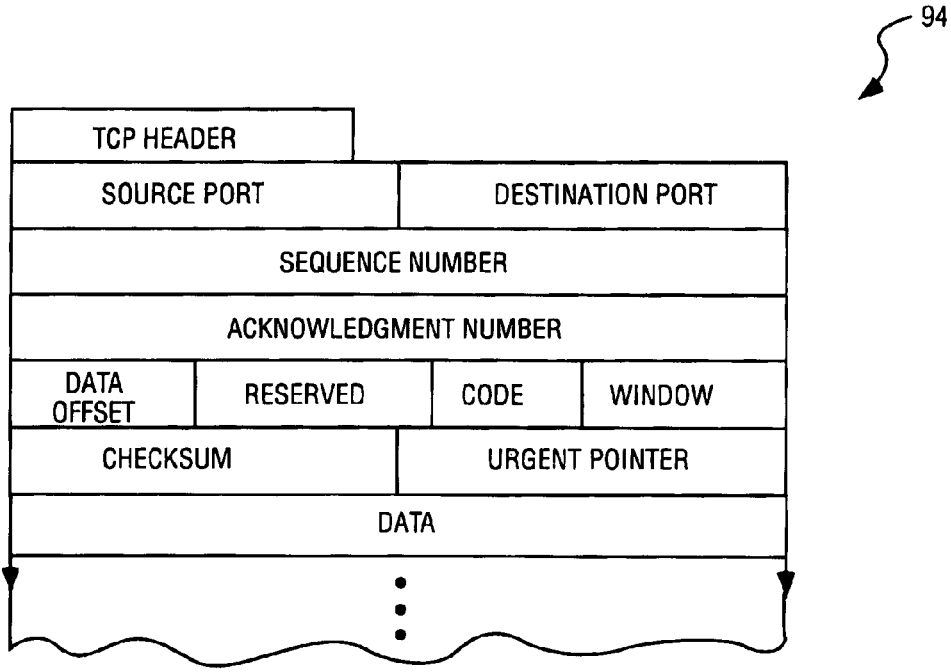
Figure 6C:
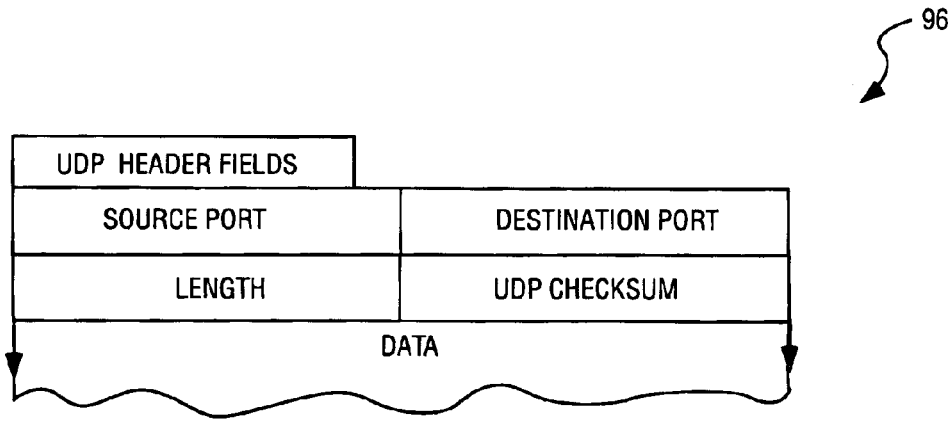

At block 78, the correlation engine 52 proceeds to step through entries for packets in each of the primary and secondary trace files, and performs a low-level decode to identify unique, static content (e.g., TCP or IP header information) within each entry that may be utilized to identify the relevant packet across multiple trace files. As discussed above, the unique static content utilized to identify a packet may vary according to protocol, with different static content being utilized for IP, IPX, UDP and TCP protocols. FIGS. 6A–6C illustrate header information 92, 94 and 96 for IP, TCP and UDP protocols respectively. The fields within these headers that may be utilized as the unique static content are discussed above.

At block 80, the correlation engine 52 then compares static information for packets extracted from both the primary and secondary trace files to identify entries for corresponding packets within both the primary and secondary trace files.

At block 82, the correlation engine 52 determines the transmission direction of packets that are common to both the primary and secondary trace files, utilizing any of the methodologies discussed above.

At block 84, the correlation engine 52 writes an entry into a correlated list 72, illustrated in FIG. 7, for each unique packet identified within both, or either of, the primary and secondary trace files. Each entry written into the correlated list 72 includes primary and secondary timestamps for the relevant packet, as extracted from the primary and secondary trace files. As illustrated in FIG. 7, each entry within the correlated list 72 includes a packet identifier 100 that constitutes, in one embodiment, the identify unique static content common to both entries for the packet within the primary and secondary trace files, a primary timestamp 102, a secondary timestamp 104, and a direction indicator 106. Accordingly, the correlated list 72 provides a merged view of information contained for respective packets within both the secondary and primary trace files.

Upon the transmission of a packet from a source to destination, it is not uncommon for the packet to experience fragmentation. For this reason, multiple entries for a unique packet may be written into the correlated list 72 where the secondary (or destination) trace file contains multiple entries for the relevant unique packet. It will be appreciated that the creation of such multiple entries requires the correlation of a packet identifier from the primary trace file with multiple packet identifiers from the secondary trace file, and vice versa.

At decision box 86, a determination is made by the correlation engine 52 whether any further trace files exist that require processing. If so, the method 64 proceeds to block 88, where the correlated list 72 is designated as the primary "trace file" and the further identified trace file is designated as the secondary trace file. The method 62 then again loops through the operations performed at blocks 78–86 until all trace files received at the diagnostic engine 28 have been processed. The method 64 then terminates at block 90.

Synchronization—Methodology

When considering the correlated list 72 illustrated in FIG. 7, it will be appreciated that the clock for the machine at which the secondary trace file is generated, and accordingly that was utilized to generate the secondary timestamps 104, may not have been fully synchronize with the clock utilized to generate the primary timestamps 102 or an error may exist with the frequency of such clock. For this reason, as described above with respect to the block 64 illustrated in FIG. 3, it may be required to synchronize the primary and secondary timestamps to a common timeline. In one embodiment, the timeline for the primary trace file is arbitrarily chosen as the common timeline, and the timestamps for all other trace files are synchronized to this timeline. Of course, the timeline of any trace file may be chosen as the common timeline, and the timelines of the other trace files synchronized to this common timeline. The synchronization maintains the physical consistency of the system (i.e., no packet should appear to travel backwards and time).

Figure 8:
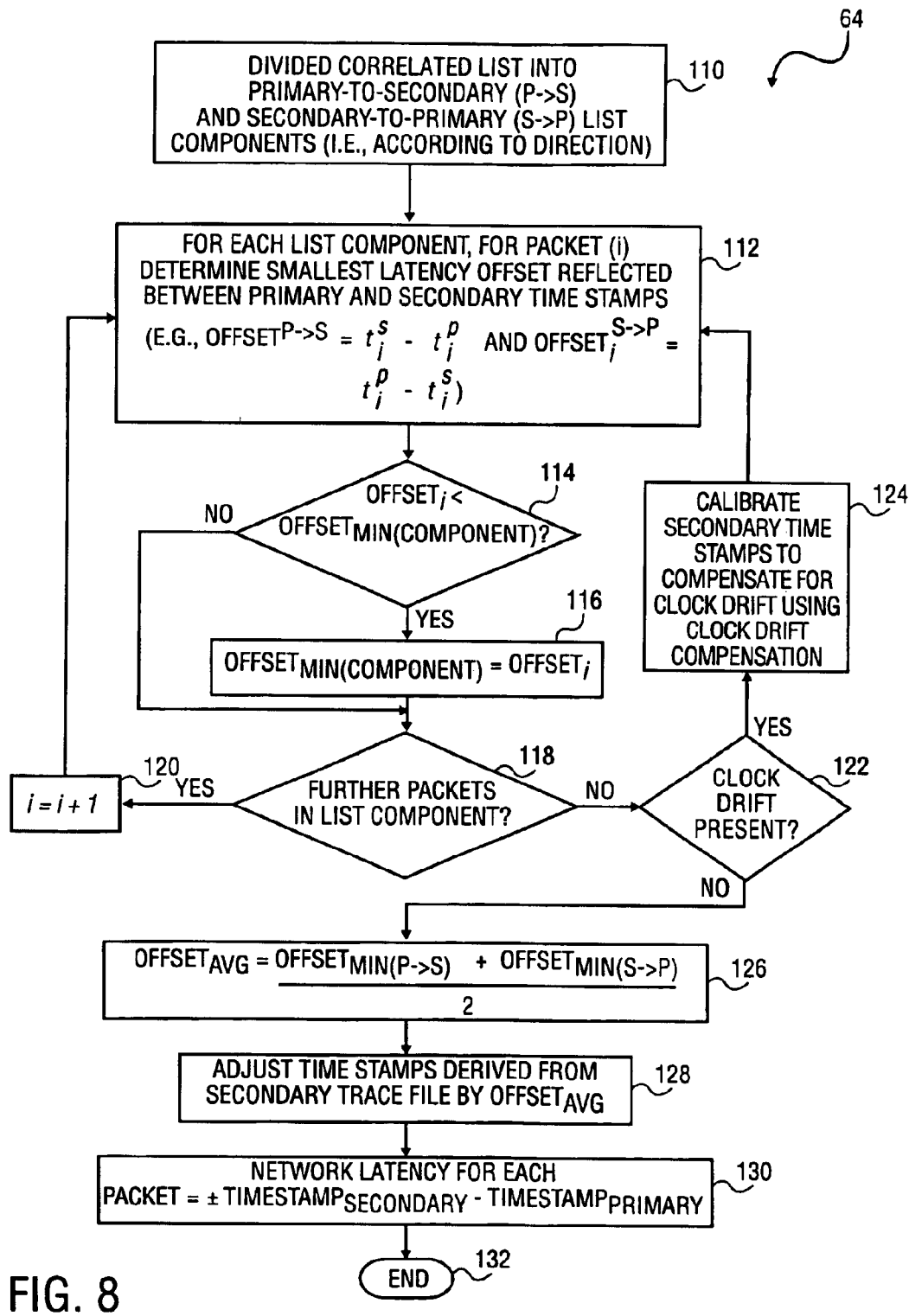
FIG. 8 is a flowchart illustrating a method, according to an exemplary embodiment of the present invention, of synchronizing timelines for multiple trace files.

FIG. 8 is a flowchart illustrating a method 64, according to exemplary embodiment of the present invention, of synchronizing the timelines (e.g., timestamps) of multiple trace files for the reasons set out above. The method 64 provides an exemplary embodiment of the operation performed at block 64 illustrated in FIG. 3.

The method 64 commences at block 110 with the synchronization engine 54 dividing the correlated list 72 into primary-to-secondary and secondary-to-primary list components (i.e., the correlated list 72 is divided into list components according to the direction indication 106).

At block 112, the synchronization engine 54, for each of the list components (e.g., the primary-to-secondary and secondary-to-primary list components) and for each unique packet (e.g., for multiple entries for packet (i) within each of the list components) identified within each list component, determines the smallest latency (or offset) between the primary and secondary timestamps. This operation may be required in view of the fragmentation of a packet as discussed above, where multiple entries for each unique packet may appear in the correlated list 72. It should furthermore be noted that the smallest latencies (or offsets) in both directions (e.g., a request and response direction) are determined (i.e., the smallest offset (primary-secondary) and the smallest offset (secondary-primary) are each determined). This is achieved by separately processing each of the list components.

Having determined the smallest offset (or latency) for a particular packet (i) in a particular direction at block 112, at decision block 114 a determination is made as to whether the offset for the relevant packet is smaller than a minimum offset for the relevant list component as previously determined by examining other packets described in the relevant list component. In the event that the offset for packet (i) is smaller than the previously determined minimum offset, then the value for the minimum offset is set to the offset for the packet (i) at block 116. On the other hand, should the previously determined minimum offset be smaller than the smallest offset for the packet (i), or upon completion of the operation at block 116, the method 64 proceeds to decision block 118 to determine whether any further unique packets, for which an offset has not as yet been calculated, are described in the relevant list component. If so, the method 64 loops through the operations performed at blocks 112–118 until all unique packets within the relevant list component have been processed. It will be appreciated that once all unique packets within a list component have been processed, the determined minimum offset will be the minimum offset determined in a particular direction.

Once a particular list component (e.g., the primary-to-secondary list component) has been processed by performing the operations at blocks 112–118, the further list component (e.g., the secondary-to-primary list component) may then be processed in a similar manner. Accordingly, the output of the method 64 includes a first minimum offset value in a first direction (e.g., the primary-to-secondary direction) and a second minimum offset value in a second direction (e.g., the secondary-to-primary direction).

Figure 9A:
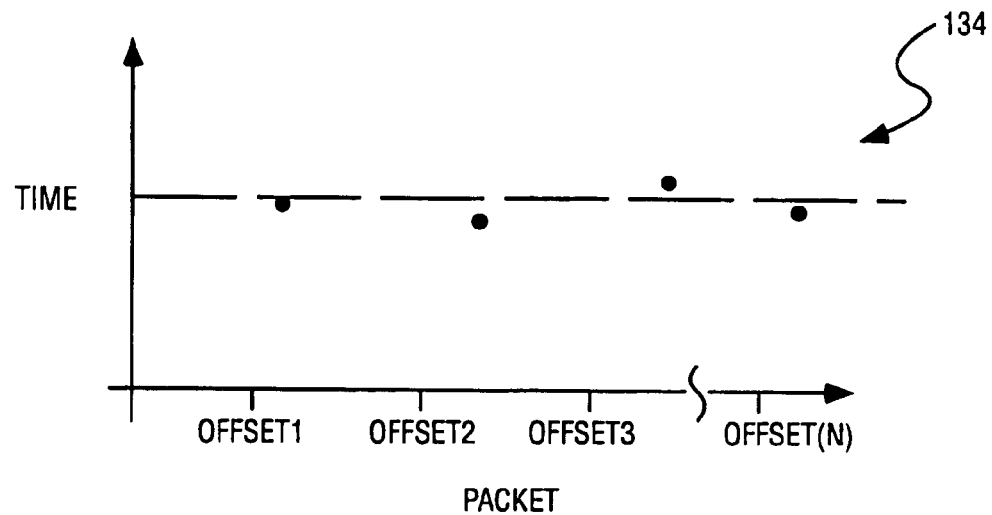
FIG. 9A illustrates a series of calculated offsets that exhibited acceptable time variances and consistency over a time interval indicative of an absence of clock drift.
Figure 9B:
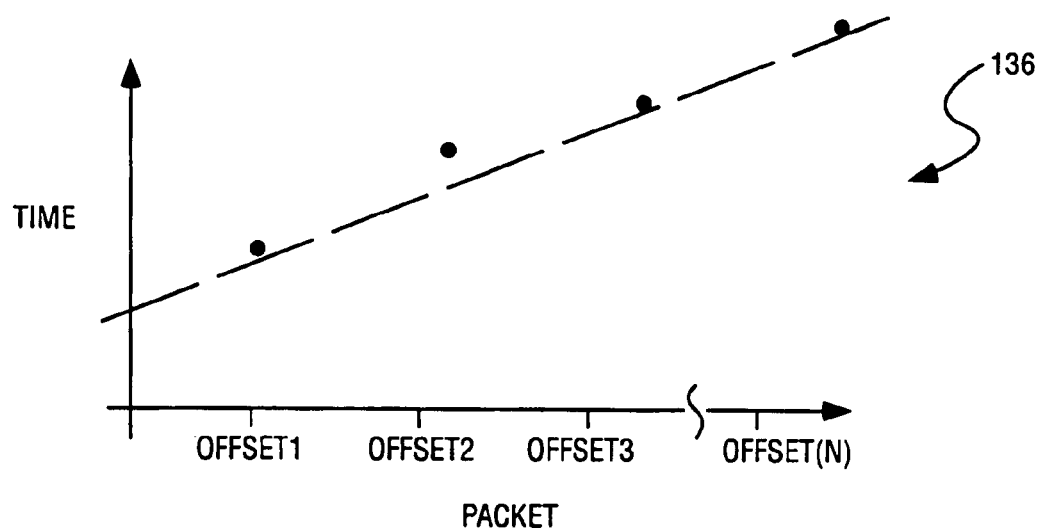
FIG. 9B illustrates a series of calculated offsets that exhibited a trend of increasing offset values over a interval, the trend being indicative of clock drift.

At decision block 122, a determination is made as to whether clock drift is exhibited by the calculated offsets. Referring to FIG. 9A, a series of calculated offsets is illustrated that exhibited acceptable time variances and a consistency across multiple unique packets, this consistency being indicative of an absence of clock drift. FIG. 9B, on the other hand, indicates a trend of increasing offsets for unique packets, this trend being indicative of clock drift. It will be appreciated that the success of the synchronization method 64 is dependent upon the accuracy of the timestamps, within the correlated list 72 and as extracted from the multiple trace files.

Two types of inaccuracies commonly appear in the packet timestamps. First, a systematic shift in all timestamps recorded over a time interval may be exhibited (i.e., the clock drift that is illustrated in FIG. 9B). This may be caused by an error in the clock frequency used to time packets. This cause may be determined by applying a windowed synchronization algorithm that attempts to synchronize trace files over a small time window. By analyzing how upper and lower limits vary over time, a systematic shift can be detected and compensated for by applying a relative correction. Second, random errors may appear in timestamps (e.g., a timestamp is actually a value from a bell-curve centered on a real timestamps value).

At block 124, should clock drift be detected, in one exemplary embodiment, the secondary timestamps 104 of the correlated list 72 are calibrated, utilizing the clock drift compensator 56, so as to compensate for the clock drift. In a completion of the operation at block 124, the offset values are then recalculated and the minimum offsets for each of the list components bargain determined by looping through the operations described with reference to blocks 112–118.

Following a determination at decision block 122 that clock drift is not present with in the calculated offsets, at block 126, an average offset is calculated utilizing the minimum offsets in each direction (i.e., offset (average)=(offset (minimum) (primary-to-secondary)+offset (minimum) (secondary-to-primary))/2).

At block 128, a symmetrical network with a common minimum latency in both request and response directions is assumed. The timestamps derived from the secondary trace file (i.e., the secondary timestamps 104 within the correlated list 72) are adjusted in accordance with this assumption utilizing the average offset so as to time shift in these secondary timestamps 104 according to the timeline of the primary trace file. For example, where the average offset is positive, the secondary timestamps 104 may simply be increased by the average offset.

At block 130, the network latency for each packet, as reflected within the correlated list 72, can accordingly be determined as the difference between the primary timestamp 102 and the adjusted secondary timestamp 104. This determined latency, as well as the values for primary and secondary timestamps 102 and 104 may then be outputted for viewing by an analyst. The output may be in the form of a numerical output, or maybe a graphical output.

Figure 10:
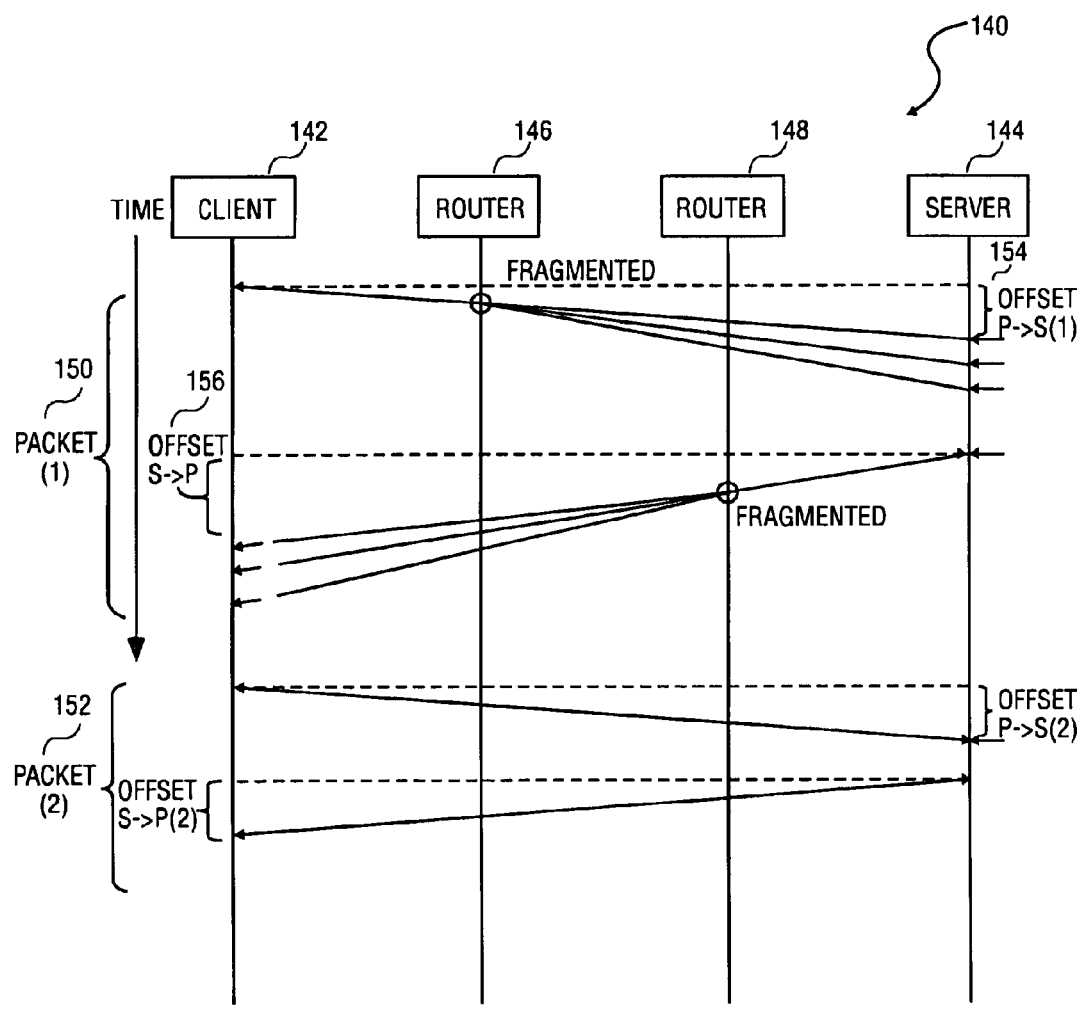
FIG. 10 illustrates an exemplary packet traffic diagram showing packet traffic between a client and server via a network including at least two routers.

FIG. 10 illustrates an exemplary packet traffic diagram 140 showing packet traffic between a client 142 and a server 144 via a network including at least two routers 146 and 148. The packet traffic diagram 140, for the purposes of illustration, shows the transmission of the first and second packets 150 and 152. The Y-axis of the diagram 140 is time and the packet 150 is accordingly shown to be transmitted from the client 142 to the first router 146, where it experiences fragmentation. Accordingly, multiple packets are shown to be received at the server 144. The offset for the packet 150, in the request direction, is accordingly graphically illustrated at 154 as being the difference between the transmission time of the packets 150 from the client 142 and the receipt time at the server 144 of a first fragment.

Following a certain time period, the server 144 is shown to transmit a response packet back to the client 142, this response packet experiencing fragmentation at the router 148. The offset for the packet 150, in the response direction, is a graphically illustrated at 156 as being the difference between the transmission time of the packet 150 from the server 144 and the receipt time at the client 142 of a first fragment.

In addition to the clock drift and fragmentation issues discussed above, in further embodiments, a number of other issues may be addressed by the present invention. First, the merge module 42 may utilize different protocols to limit a search space within a trace file and may utilize actual data in the datagram of a packet as an additional correlation point when the potential for incorrect correlation exists. As discussed above, certain fields from IP and PC packets may be utilized to correlate packets. These may be reused by the TCP stack in a number of ways. For example, IP addresses may be used by different nodes if DHCP is implemented, TCP and UDP ports may be reused by subsequent connections, IP fragment identifiers repeat after 65536 packets have been sent, and TCP sequence and acknowledge numbers will repeat after 4294967296 bytes of data have been sent. For TCP packets, there is a very small probability that a correlation, performed in the above-described manner, would be incorrect even if traces are compared from different days of traffic between the same IP addresses and ports. However, simpler protocols (e.g., IP) have much less correlation data to rely on. Specifically, as described above, the merge module 42 may utilize only IP addresses and fragment identifiers to correlate IP packets. Accordingly, if more than 65535 packets of pure IP traffic are transmitted between the same two nodes, correlation may become unreliable. To address this potential problem, the present invention proposes that if correlated TCP packets are seen in the same trace file, these may be utilized to limit search space for matching IP packets and thereby improved reliablity. Additionally, the merge module 42 may utilize actual data in the datagram as an additional correlation point.

A further issue is the existence of inspection firewalls, which may implement address translation. Address translation allows an IP packet to mutate by modifying certain fields as the packet passes through the inspection file. Only IP addresses and port numbers are likely to be changed by such an inspection firewall. The present invention proposes, for such scenarios involving address translation, that correlation requirements may be relaxed. Specifically, IP addresses and ports may be discarded for correlation purposes. As previously discussed, the discarding of IP addresses and ports presents few problems for TCP packets, as correlation still has sufficient correlation requirements to succeed. However, for UDP and other IP protocols, there is a greater likelihood of incorrect correlation as the only remaining correlation requirements may be IP fragment identifiers. Incorrect correlation may occur where ranges of IP fragment identifiers overlap. Again, as proposed above, TCP packets in a trace file may be utilized to limit the search space for matching IP packets, and thus improve correlation reliability. Data in the datagram may also be used as an additional correlation point when correlating non-TCP, address-translated traffic.

For broadcast traffic or unidirectional traffic, such as seen from a streaming media server, the correlation operation described above with reference to FIG. 4 may be performed, but the synchronization operation described with respect to FIG. 8 will fail unless there is bi-directional traffic between the nodes that operators capture points. With unidirectional traffic, only a lower limit on a shift to be applied to the timestamps of the secondary trace file would be obtained. If a "node map" is known, then the merge module 42 may utilize a minimum round-trip latency to each node to estimate the minimum network delay (or offset) and use that as an upper limit.

Thus, a method and system to calculate network latency, and to display the same, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of calculating network latency, the method including:

correlating a first packet identifier recorded at a first network location with a second packet identifier recorded at a second network location, wherein the first and second packet identifiers indicate a common first packet and have respective first and second timestamps associated therewith; and calculating a first network traversal time for the first packet as the difference between the first and second timestamps associated with the first and second packet identifiers respectively, wherein the first packet identifier and the first timestamp are contained in a first trace file captured at the first network location, and the second packet identifier and the second timestamp are contained in a second trace file captured at the second network location.

2. The method of claim 1 including at least partially merging the first and second trace files into a merged file, the merged file containing an entry for each correlation of a first packet identifier with a second packet identifier.

3. The method of claim 1 wherein the correlating includes correlating the first packet identifier with multiple packet identifiers recorded at the second network location as a result of fragmentation of the first packet during transmission from the first network location to the second network location.

4. The method of claim 3 wherein the calculating includes calculating multiple traversal times as the respective differences between the first timestamp and each of multiple timestamps associated with the respective multiple packet identifiers.

5. The method of claim 4 including identifying a minimum traversal time from among the multiple traversal times as a selected offset.

6. The method of claim 1 including determining whether clock drift influenced a plurality of traversal times for a plurality of packets transmitted between the first and second network locations and, if so, then adjusting the plurality of traversal times to compensate for the clock drift.

7. The method of claim 6 wherein the adjusting of the plurality of traversal times includes calibrating each of a plurality of timestamps associated with a plurality of packet identifiers recorded at the second network location.

8. The method of claim 1 wherein bi-directional packet transmissions occur between the first and second network locations, and the correlating includes determining a direction of transmission of the first packet between the first and second network locations.

9. The method of claim 1 wherein the first packet is transmitted from the first network location to the second network location, the method including correlating a third packet identifier recorded at the second network location with a fourth packet identifier recorded at the first network location, wherein the third and fourth packet identifiers identify a second packet transmitted from the second network location to the first network location responsive to the first packet, and wherein the third and fourth packet identifiers have respective third and fourth timestamps associated therewith.

10. The method of claim 9 including calculating a second network traversal time for the second packet as the difference between the third and fourth timestamps.

11. The method of claim 10 including calculating an average traversal time between the first and second network locations as the average of the first and second network traversal times.

12. The method of claim 10 wherein the first and second network traversal times are minimum traversal times for fragmented transmissions of the first and second packets respectively.

13. The method of claim 11 including adjusting at least the first traversal time based on the average traversal time.

14. The method of claim 11 including adjusting the first and second traversal times based on the average traversal time.

15. The method of claim 13 wherein the adjusting includes calibrating timestamps associated with the second network location utilizing the average traversal time.

16. The method of claim 1 including outputting at least the first traversal time.

17. The method of claim 16 wherein the outputting comprises generating a graphical display of the first traversal time.

18. A system to calculate network latency, the system including:

a correlation engine to correlate a first packet identifier recorded at a first network location with a second packet identifier recorded at a second network location, wherein the first and second packet identifiers indicate a common first packet and have respective first and second timestamps associated therewith; and a synchronization engine to calculate a first network traversal time for the first packet as the difference between the first and second timestamps associated with the first and second packet identifiers respectively, wherein the first packet identifier and the first timestamp are contained in a first trace file captured at the first network location, and the second packet identifier and the second timestamp are contained in a second trace file captured at the second network location.

19. The system of claim 18 wherein the synchronization engine is to at least partially merge the first and second trace files into a merged file, the merged file containing an entry for each correlation of a first packet identifier with a second packet identifier.

20. The system of claim 18 wherein the correlation engine is to correlate the first packet identifier with multiple packet identifiers recorded at the second network location as a result of fragmentation of the first packet during transmission from the first network location to the second network location.

21. The system of claim 20 wherein the synchronization engine is to calculate multiple traversal times as the respective differences between the first timestamp and each of multiple timestamps associated with the respective multiple packet identifiers.

22. The system of claim 21 wherein the synchronization engine is to identify a minimum traversal time from among the multiple traversal times as a selected offset.

23. The system of claim 18 wherein the synchronization engine is to determine whether clock drift influenced a plurality of traversal times for a plurality of packets transmitted between the first and second network locations and, if so, then to adjust the plurality of traversal times to compensate for the clock drift.

24. The system of claim 23 wherein the synchronization engine is to calibrate each of a plurality of timestamps associated with a plurality of packet identifiers recorded at the second network location.

25. The system of claim 18 wherein bi-directional packet transmissions occur between the first and second network locations, and the correlation engine is to determine a direction of transmission of the first packet between the first and second network locations.

26. The system of claim 18 wherein the first packet is transmitted from the first network location to the second network location, the correlation engine is to correlate a third packet identifier recorded at the second network location with a fourth packet identifier recorded at the first network location, wherein the third and fourth packet identifiers a second packet transmitted from the second network location to the first network location responsive to the first packet, and wherein the third and fourth packet identifiers have respective third and fourth timestamps associated therewith.

27. The system of claim 26 wherein the synchronization engine is to calculate a second network traversal time for the second packet as the difference between the third and fourth timestamps.

28. The system of claim 27 wherein the synchronization engine is to calculate an average traversal time between the first and second network locations as the average of the first and second network traversal times.

29. The system of claim 27 wherein the first and second network traversal times are minimum traversal times for fragmented transmissions of the first and second packets respectively.

30. The system of claim 28 wherein the synchronization engine is to adjust at least the first traversal time based on the average traversal time.

31. The system of claim 28 wherein the synchronization engine is to adjust the first and second traversal times based on the average traversal time.

32. The system of claim 30 wherein the synchronization engine is to calibrate timestamps associated with the second network location utilizing the average traversal time.

33. The system of claim 18 including a visualization module to output at least the first traversal time.

34. The system of claim 33 wherein the visualization module is to generate a graphical display of the first traversal time.

35. A computer-readable medium storing a sequence of instructions that, when executed by machine, causing machine to perform method of calculating network latency, the method including:
    correlating a first packet identifier recorded at a first network location with a second packet identifier recorded at a second network location, wherein the first and second packet identifiers indicate a common first packet and have respective first and second timestamps associated therewith; and
    calculating a first network traversal time for the first packet as the difference between the first and second timestamps associated with the first and second packet identifiers respectively,
    wherein the first packet identifier and the first timestamp are contained in a first trace file captured at the first network location, and the second packet identifier and the second timestamp are contained in a second trace file captured at the second network location.

36. A method of calculating network latency, the method including:
    correlating a first packet identifier recorded at a first network location with a second packet identifier recorded at a second network location, wherein the first and second packet identifiers indicate a common first packet and have respective first and second timestamps associated therewith;
    calculating a first network traversal time for the first packet as the difference between the first and second timestamps associated with the first and second packet identifiers respectively; and
    determining whether clock drift influenced a plurality of traversal times for a plurality of packets transmitted between the first and second network locations and, if so, then adjusting the plurality of traversal times to compensate for the clock drift, including calibrating each of a plurality of timestamps associated with a plurality of packet identifiers recorded at the second network location.

37. A method of calculating network latency, the method including:
    correlating a first packet identifier recorded at a first network location with a second packet identifier recorded at a second network location, wherein the first and second packet identifiers indicate a common first packet and have respective first and second timestamps associated therewith;
    calculating a first network traversal time for the first packet as the difference between the first and second timestamps associated with the first and second packet identifiers respectively, wherein the first packet is transmitted from the first network location to the second network location, the method including correlating a third packet identifier recorded at the second network location with a fourth packet identifier recorded at the first network location, wherein the third and fourth packet identifiers identify a second packet transmitted from the second network location to the first network location responsive to the first packet, and wherein the third and fourth packet identifiers have respective third and fourth timestamps associated therewith; and
    calculating a second network traversal time for the second packet as the difference between the third and fourth timestamps, and wherein the first and second network traversal times are minimum traversal times for fragmented transmissions of the first and second packets respectively.

38. A method of calculating network latency, the method including:
    correlating a first packet identifier recorded at a first network location with a second packet identifier recorded at a second network location, wherein the first and second packet identifiers indicate a common first packet and have respective first and second timestamps associated therewith;
    calculating a first network traversal time for the first packet as the difference between the first and second timestamps associated with the first and second packet identifiers respectively, wherein the first packet is transmitted from the first network location to the second network location, the method including correlating a third packet identifier recorded at the second network location with a fourth packet identifier recorded at the first network location, wherein the third and fourth packet identifiers identify a second packet transmitted from the second network location to the first network location responsive to the first packet, and wherein the third and fourth packet identifiers have respective third and fourth timestamps associated therewith;
    calculating a second network traversal time for the second packet as the difference between the third and fourth timestamps;
    calculating an average traversal time between the first and second network locations as the average of the first and second network traversal times; and
    adjusting at least the first traversal time based on the average traversal time, including calibrating timestamps associated with the second network location utilizing the average traversal time.

39. The method of claim 38, wherein the first and second network traversal times are minimum traversal times for fragmented transmissions of the first and second packets respectively.

40. The method of claim 38, including adjusting the second traversal times based on the average traversal time.

41. The method of claim 38, including outputting at least the first traversal time.

42. The method of claim 39, wherein the outputting comprises generating a graphical display of the first traversal time.

43. A system to calculate network latency, the system including:
- a correlation engine to correlate a first packet identifier recorded at a first network location with a second packet identifier recorded at a second network location, wherein the first and second packet identifiers indicate a common first packet and have respective first and second timestamps associated therewith; and
- a synchronization engine to calculate a first network traversal time for the first packet as the difference between the first and second timestamps associated with the first and second packet identifiers respectively, the synchronization engine configured to
   - determine whether clock drift influenced a plurality of traversal times for a plurality of packets transmitted between the first and second network locations and, if so, then to adjust the plurality of traversal times to compensate for the clock drift, and
   - calibrate each of a plurality of timestamps associated with a plurality of packet identifiers recorded at the second network location.

44. The system of claim 43, wherein the synchronization engine is to at least partially merge the first and second trace files into a merged file, the merged file containing an entry for each correlation of a first packet identifier with a second packet identifier.

45. The system of claim 43, wherein the correlation engine is to correlate the first packet identifier with multiple packet identifiers recorded at the second network location as a result of fragmentation of the first packet during transmission from the first network location to the second network location.

46. The system of claim 45, wherein the synchronization engine is to calculate multiple traversal times as the respective differences between the first timestamp and each of multiple timestamps associated with the respective multiple packet identifiers.

47. The system of claim 46, wherein the synchronization engine is to identify a minimum traversal time from among the multiple traversal times as a selected offset.

48. The system of claim 43, wherein bi-directional packet transmissions occur between the first and second network locations, and the correlation engine is to determine a direction of transmission of the first packet between the first and second network locations.

49. The system of claim 43, wherein the first packet is transmitted from the first network location to the second network location, the correlation engine is to correlate a third packet identifier recorded at the second network location with a fourth packet identifier recorded at the first network location, wherein the third and fourth packet identifiers identify a second packet transmitted from the second network location to the first network location responsive to the first packet, and wherein the third and fourth packet identifiers have respective third and fourth timestamps associated therewith.

50. The system of claim 49, wherein the synchronization engine is to calculate a second network traversal time for the second packet as the difference between the third and fourth timestamps.

51. The system of claim 50, wherein the synchronization engine is to calculate an average traversal time between the first and second network locations as the average of the first and second network traversal times.

52. The system of claim 50, wherein the first and second network traversal times are minimum traversal times for fragmented transmissions of the first and second packets respectively.

53. The system of claim 51, wherein the synchronization engine is to adjust at least the first traversal time based on the average traversal time.

54. The system of claim 51, wherein the synchronization engine is to adjust the first and second traversal times based on the average traversal time.

55. The system of claim 53, wherein the synchronization engine is to calibrate timestamps associated with the second network location utilizing the average traversal time.

56. The system of claim 43, including a visualization module to output at least the first traversal time.

57. The system of claim 56, wherein the visualization module is to generate a graphical display of the first traversal time.

* * * * *

UNITED STATES PATENT AND TRADEMARK OFFICE
CERTIFICATE OF CORRECTION

PATENT NO. : 6,922,417 B2
DATED : July 26, 2005
INVENTOR(S) : Paul Vanlint

It is certified that error appears in the above-identified patent and that said Letters Patent is hereby corrected as shown below:

Title page,
Item [54], Title, replace "METHOD AND SYSTEM TO CALCULATE NETWORK LATENCY, AND TO DISPLAY THE SAME FIELD OF THE INVENTION" with -- METHOD AND SYSTEM TO CALCULATE NETWORK LATENCY, AND TO DISPLAY THE SAME --.

Column 13,
Line 2, insert -- identify -- before "a second".

Signed and Sealed this

Twenty-second Day of November, 2005

JON W. DUDAS
*Director of the United States Patent and Trademark Office*